(No Model.)
C. H. ANSPACH.
VEGETABLE SLICER.
No. 564,962.  Patented Aug. 4, 1896.
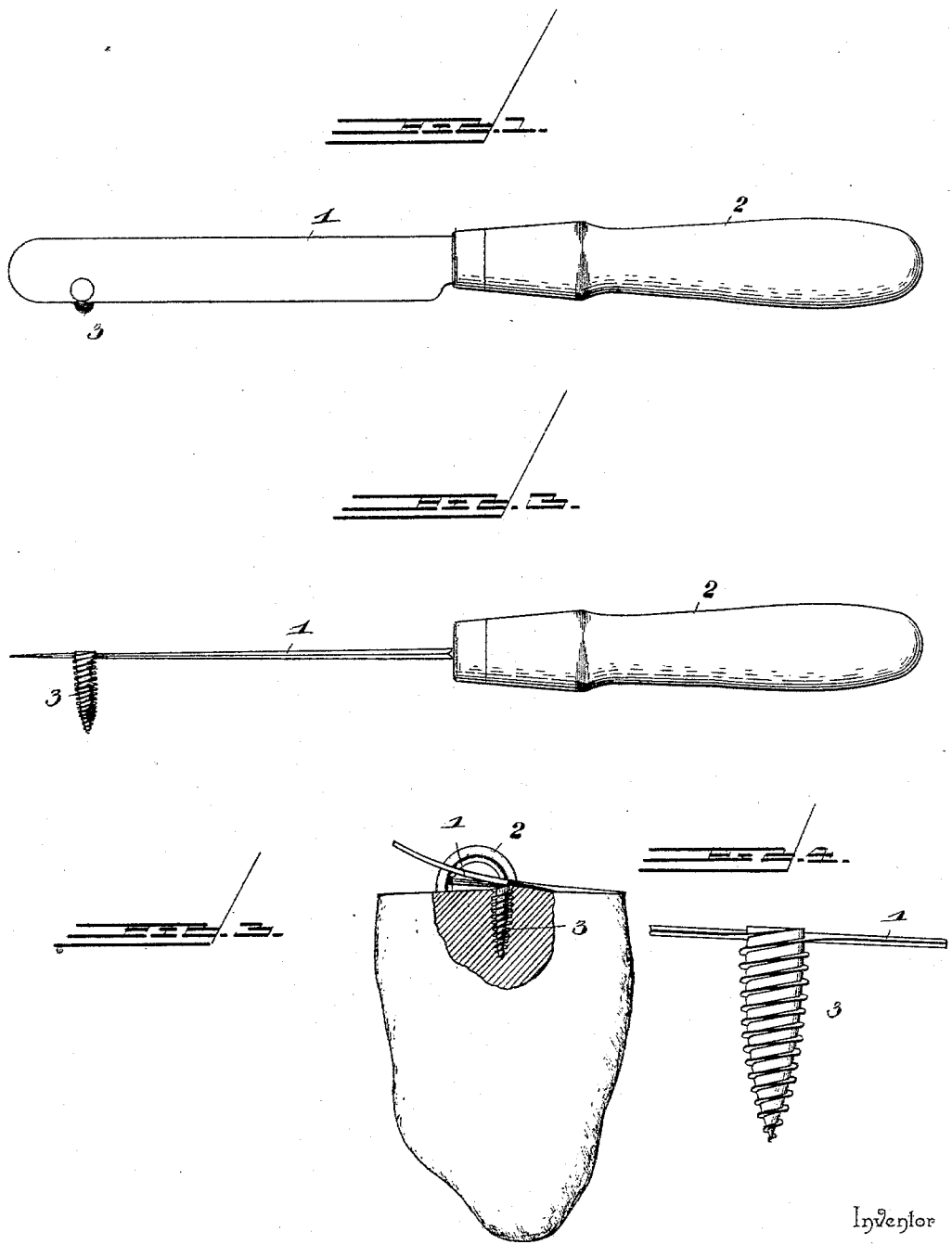
Witnesses
W. H. Doyle.
V. B. Hillyard.
Inventor
Charles H. Anspach,
By his Attorneys,
C. A. Snow & Co.

UNITED STATES PATENT OFFICE.

CHARLES H. ANSPACH, OF CEDAR GROVE, INDIANA.

VEGETABLE-SLICER.

SPECIFICATION forming part of Letters Patent No. 564,962, dated August 4, 1896.

Application filed December 23, 1895. Serial No. 573,094. (No model.)

*To all whom it may concern:*

Be it known that I, CHARLES H. ANSPACH, a citizen of the United States, residing at Cedar Grove, in the county of Franklin and State of Indiana, have invented a new and useful Vegetable-Slicer, of which the following is a specification.

This invention relates to knives especially designed for paring and slicing vegetables and fruits; and the purpose of the improvement is to provide a knife of this character having a feed-screw near one end which can be used for either purpose, and which will be positive in its action and cause the cutting edge of the knife to engage with the fruit or vegetable so as to secure a clean cut.

A further purpose of the invention is to secure clearance and a free passage for the spiral slice as the latter is cut, and to attain a positive feed of the knife without any especial care on the part of the user.

The improvement consists, primarily, of a knife having a notch in its cutting edge and having the feed-screw fitted into the said notch, and having the portions of the knife-blade upon opposite sides of the feed-screw bent in opposite directions to conform to and correspond with the thread of the said feed-screw, so as to form a continuation thereof.

The improvement further consists in certain details and novel features of construction, which hereinafter will be more particularly set forth, illustrated, and claimed.

Referring to the accompanying drawings for a more complete explanation of the invention, Figure 1 is a top plan view of a knife having the invention applied thereto. Fig. 2 is an edge view thereof. Fig. 3 is an end view showing the application of the invention. Fig. 4 is an enlarged detail view showing the portions of the cutting edge adjacent to the feed-screw bent in opposite directions to conform with and merge into the thread thereof.

The knife 1 may be of any form, and is provided with a handle 2, and a notch or opening is formed near the end of the knife and extends through its cutting edge, and in this notch or opening is fitted and secured the feed-screw 3. The portions of the cutting edge upon opposite sides of the feed-screw are bent in opposite directions to correspond with the thread of the feed-screw and form in effect a continuation thereof. Thus the space between the thread is unobstructed throughout the length of the feed-screw, thereby providing for the free escape of the slice in the operation of the knife. The feed-screw inclines slightly toward the handle and away from the back of the knife, thereby causing the knife when in use to incline slightly to the plane of its rotation, whereby its cutting edge engages positively with the fruit or vegetable, so as the better to cut the slice. This is shown most clearly in Fig. 3. By locating the feed-screw a short distance from the end of the knife the point of the latter can be used for removing blemishes from fruit or vegetables or eyes from potatoes.

The invention can be readily applied to any style and pattern of knife generally employed for paring and slicing fruit and vegetables, and the feed-screw can be attached thereto in any substantial manner, either by brazing, soldering, or in any of the ways commonly employed in the mechanic arts for connecting rigidly metallic parts to be united.

Having thus described the invention, what is claimed as new is—

1. A knife for slicing fruit and vegetables, having a feed-screw secured to the said knife adjacent to its cutting edge, and having the portions of the cutting edge upon opposite sides of the said feed-screw bent in opposite directions and forming a continuation and merging into the thread of the feed-screw, substantially as shown for the purpose described.

2. A knife for slicing vegetables and fruit, having a feed-screw a short distance from its end and inclining slightly toward the handle and away from the back of the knife, and arranged contiguous to the cutting edge and having the latter oppositely deflected upon opposite sides of the feed-screw and conforming and merging into the thread thereof, substantially as and for the purpose specified.

In testimony that I claim the foregoing as my own I have hereto affixed my signature in the presence of two witnesses.

CHARLES H. ANSPACH.

Witnesses:
WM. GEIS,
GEORGE GEIS.